United States Patent
Lau et al.

(10) Patent No.: US 9,571,596 B2
(45) Date of Patent: Feb. 14, 2017

(54) ENABLING PUSH NOTIFICATIONS FROM WEBSITES

(71) Applicant: Microsoft Technology Licensing, LLC, Redmond, WA (US)

(72) Inventors: Cheuk Wan William Lau, Bellevue, WA (US); Robert M. Dolin, Seattle, WA (US); Larry Jin, Seattle, WA (US); Smriti Yamini, Redmond, WA (US); Melanie Vanessa Roberts, Bothell, WA (US); Lan Tang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 14/185,146

(22) Filed: Feb. 20, 2014

(65) Prior Publication Data

US 2015/0237151 A1    Aug. 20, 2015

(51) Int. Cl.
*G06F 15/16* (2006.01)
*H04L 29/08* (2006.01)

(52) U.S. Cl.
CPC .................................. *H04L 67/26* (2013.01)

(58) Field of Classification Search
USPC ............... 709/206, 222, 223, 224, 227, 229
See application file for complete search history.

(56) References Cited

U.S. PATENT DOCUMENTS

| 8,090,776 B2 | 1/2012 | Torres et al. |
| 2011/0173681 A1 | 7/2011 | Qureshi et al. |
| 2011/0207446 A1 | 8/2011 | Iwuchukwu |
| 2012/0197883 A1 | 8/2012 | Robinson et al. |
| 2012/0226813 A1* | 9/2012 | Ragusa ................. G06F 9/5027 709/227 |
| 2012/0330668 A1 | 12/2012 | Verna et al. |
| 2013/0024267 A1* | 1/2013 | Libenson ............... G06Q 30/02 705/14.38 |
| 2013/0097706 A1* | 4/2013 | Titonis .................... G06F 21/56 726/24 |
| 2013/0111368 A1 | 5/2013 | Laughlin |
| 2014/0101582 A1* | 4/2014 | Bamford ............... G06F 3/0484 715/765 |

(Continued)

OTHER PUBLICATIONS

"International Search Report and Written Opinion", Application No. PCT/US2015/015301, Apr. 20, 2015, 11 Pages.

(Continued)

*Primary Examiner* — Liangche A Wang
(74) *Attorney, Agent, or Firm* — Bryan Webster; Dan Choi; Micky Minhas

(57) ABSTRACT

Techniques for enabling push notifications from websites are described. In at least some embodiments, a push notification generally represents a way for a website to push information to a client device. For instance, a push notification may include content (e.g., text, images, video, audio, and so forth) that a website pushes to a client device. The content can be output via the client device, e.g., independently of an output of the website itself. According to one or more embodiments, a push notification channel is generated that enables notifications to be pushed from a website to a client device. Generally, a push notification channel represents a set of attributes and procedures that enable notifications to be securely and accurately pushed from a website to a client device.

20 Claims, 13 Drawing Sheets

(56) References Cited

U.S. PATENT DOCUMENTS

2014/0164909 A1* 6/2014 Graff ................ G06F 17/30899
715/234
2014/0342716 A1* 11/2014 Harris .................... H04W 8/22
455/418

OTHER PUBLICATIONS

Benton, "Now Websites Can Send Push Notifications—Not Just Apps", Retrieved from: <http://www.niemanlab.org/2013/06/now-websites-can-send-push-notifications-not-just-apps/> on Oct. 11, 2013, Jun. 10, 2013, 4 pages.
Moulster, "Live Tiles for Pinned Websites in Windows 8.1", Retrieved from: <http://blogs.msdn.com/b/ianm/archive/2013/09/11/live-tiles-for-pinned-websites-in-windows-8-1.aspx> on Oct. 4, 2013, Sep. 11, 2013, 2 pages.
Sinofsky, "Updating Live Tiles Without Draining Your Battery", Retrieved from: <http://blogs.msdn.com/b/b8/archive/2011/11/02/updating-live-tiles-without-draining-your-battery.aspx> on Oct. 7, 2013, Nov. 3, 2011, 45 pages.
Taulty, "Windows 8: Live Tiles, Services, Authentication", Retrieved from: <http://mtaulty.com/CommunityServer/blogs/mike_taultys_blog/archive/2013/08/08/windows-8-live-tiles-services-authentication.aspx> on Oct. 7, 2013, Aug. 8, 2013, 3 pages.

* cited by examiner

ENABLING PUSH NOTIFICATIONS FROM WEBSITES

BACKGROUND

Modern computing devices have access to a wide variety of online content, such as webpages, web applications, mobile applications, and so forth. Increasingly, online content can be accessed via dedicated icons that represent discrete instances of online content. For instance, a device can display "tiles" that represent different instances of online content, and that are selectable to access the different instances of online content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for enabling push notifications from websites are described. In at least some embodiments, a push notification generally represents a way for a website to push information to a client device. For instance, a push notification may include content (e.g., text, images, video, audio, and so forth) that a website pushes to a client device. The content can be output via the client device, e.g., independently of an output of the website itself. According to one or more embodiments, a push notification channel is generated that enables notifications to be pushed from a website to a client device. Generally, a push notification channel represents a set of attributes and procedures that enable notifications to be securely and accurately pushed from a website to a client device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
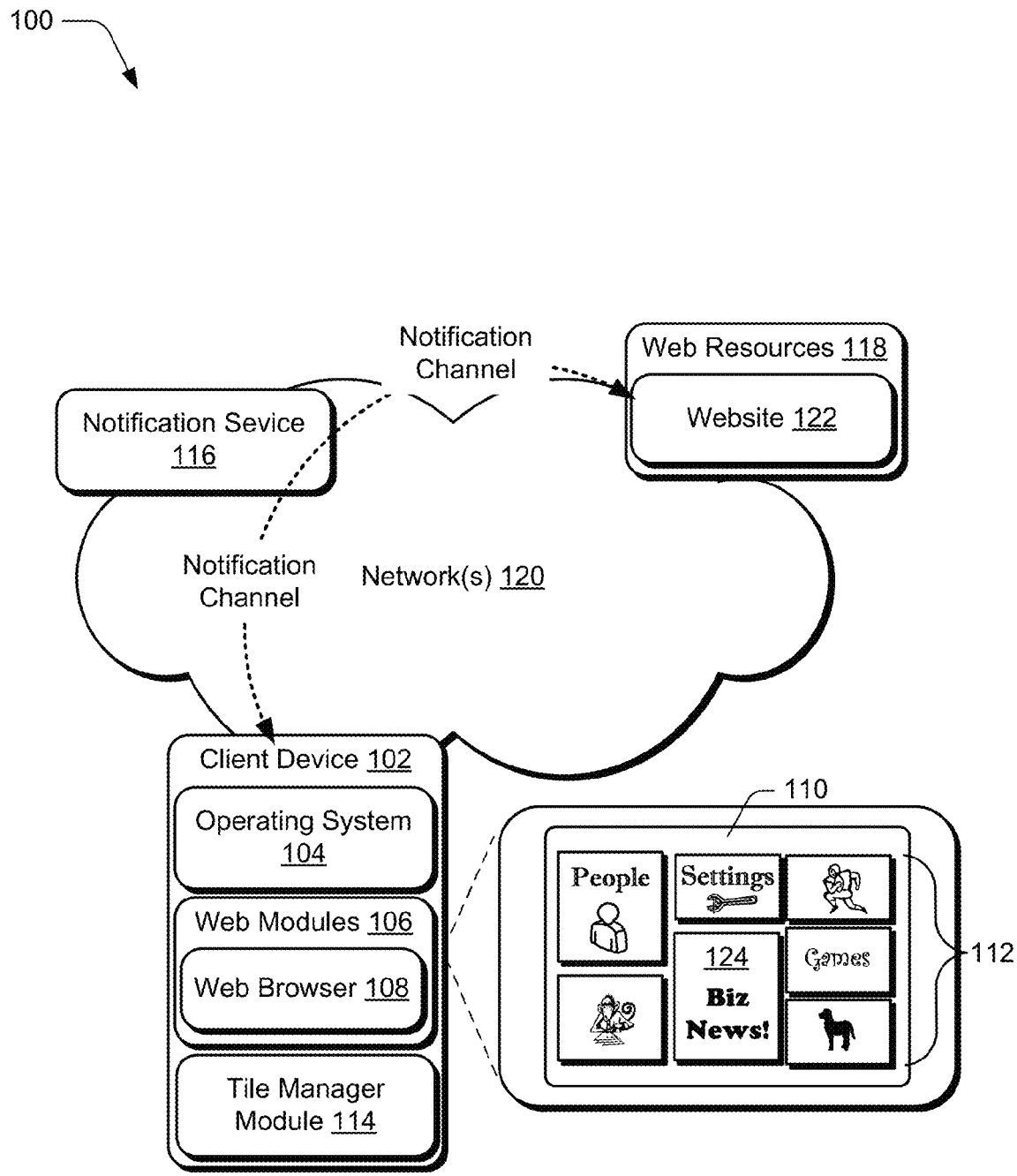
FIG. 1 is an illustration of an environment in an example implementation that is operable to employ techniques discussed herein.

Techniques for enabling push notifications from websites are described. In at least some embodiments, a push notification generally represents a way for a website to push information to a client device. For instance, a push notification may include content (e.g., text, images, video, audio, and so forth) that a website pushes to a client device. The content can be output via the client device, e.g., independently of an output of the website itself.

In an example implementation, consider a scenario where a user browses to a website via a web browser or other web-enabled application. The user is presented with an option to create a tile for the website, such as via selection of a button or other selectable indicia. Generally, a "tile" refers to a visual representation of content and/or functionality. For instance, tiles may be used to represent applications, content (e.g., files, video, audio, images, and so forth), websites, folders, network locations, and so on. In at least some embodiments, selection of a tile causes associated content and/or functionality to be presented. For instance, selection of a website's tile causes a navigation to the website, such as via a web browser.

Continuing with the example scenario, the user selects the option to create a tile for the website. Thus, a tile is created for the website and displayed on the user's device. According to one or more embodiments, creation of the tile causes a push notification channel to be generated. Generally, a push notification channel represents a set of attributes and procedures that enable notifications to be securely and accurately pushed from a website to a client device. In the example scenario, for instance, the push notification channel enables the website to push content to the user's device to be used to populate the website's tile. Thus, the website can utilize the push notification channel to push updates to the tile to be used to occasionally and/or periodically update the tile.

For instance, consider that the website is a news-based website. The news website may push breaking headlines to the user's device to be displayed as part of the tile. The user may select the tile to navigate to the website to view further details concerning the breaking headlines. As another example, the website may be an online gaming website. The gaming website may push game-related information to be displayed via the tile, such as identifiers for other users that are currently playing a game via the website. In such a scenario, the user may select the tile to launch the gaming website and engage in gameplay.

These scenarios are presented for purpose of example only, and is to be appreciated that embodiments may be employed in a variety of different scenarios not expressly discussed herein. Further, and as detailed below, types of notifications other than tiles may be additionally or alternatively employed.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for enabling push notifications from websites described herein. The environment 100 includes a client device 102 that is representative of various types and form factors of devices that can consume online content. While the client device 102 is illustrated in this example as a tablet device, this is not to be construed as limiting. The client device 102, for instance, may be configured in a variety of ways, such as a traditional computer (e.g., a desktop personal computer, laptop computer, and so on), a mobile station, an entertainment appliance, a smartphone, a netbook, a game console, a handheld device, and so forth.

The client device 102 includes an operating system 104, which is representative of functionality to enable various functionalities and components of the client device 102 to interact to perform various tasks. The client device 102 further includes web modules 106, which are representative of different functionalities for accessing web-based content and/or web-based functionalities. Examples of the web modules 106 include web browsers, web applications, mobile applications, cloud application clients, links to websites and/or web content, and so forth. The web modules 106, for example, include a web browser 108.

Displayed on a display 110 of the client device 102 are tiles 112. According to one or more embodiments, the tiles 112 are visual indicia that are individually selectable to access respective instances of content and/or functionality. The usage herein of the term "tile" and the accompanying illustrations are not to be construed as limiting, and a "tile" includes any suitable visual indicia associated with various content and/or functionality. For instance, at least some of the tiles 112 are linked to instances of the web modules 106, and thus are selectable to invoke the respective web modules 106. Additionally or alternatively, and at least some of the tiles 112 may be selectable to access content and/or functionality that is local to the client device 102, e.g., additionally or alternatively to web-based content and/or functionality.

The client device 102 also includes a tile manager module 114, which is representative of functionality to manage various attributes of the tiles 112. For instance, the tile manager module 114 can enable a particular tile 112 to be installed, updated, uninstalled, and so forth. Further functionalities and attributes of the tile manager module 114 are discussed below. The tile manager module 114 may be implemented in various ways, such as a standalone functionality, as a part or extension of the operating system 104, and so forth.

The environment 100 further includes a notification service 116 and web resources 118, which are communicably associated via a network 120. The network 120 may be configured in a variety of ways, such as a wide area network (WAN), a local area network (LAN), the Internet, and so forth. Further, the network 120 may include a single network and/or a combination of different types and/or instances of networks.

The notification service 116 is representative of functionality to provide various types of notifications to the client device 102, as well as to other devices and/or entities. Examples of such notifications include information concerning updates that are available for the client device 102 (e.g., for the web modules 106), updated content for the tiles 112, and so forth. In at least some embodiments, for instance, the tiles 112 are considered "live" in the sense that the tiles can be periodically and/or dynamically updated. For instance, visual content of the individual tiles 112 may be updated in response to various events. The notification service 116, for example, can push updated content to the client device 102, such as to the tile manager module 114, to be used to update one or more of the tiles 112.

The web resources 118 are representative of different entities that provide various types of web-based content and/or functionality. Examples of the web resources 118 include websites, web application hosts, cloud services, mobile application hosts, enterprise servers, and so forth. In at least some embodiments, for instance, the web resources 118 represent infrastructure(s) for producing, managing, and exposing different types and instances of web-based content and/or functionality.

In an example implementation, consider that a user utilizes the client device 102 to browse the web browser 108 to a website 122 of the web resources 118. The user decides that the website 122 is interesting and that the user will likely want to return to the website 122 again in the future. Accordingly, the user requests that a tile 124 be generated for the website 122. The user can indicate this request in various ways, such as by selecting a selectable control displayed as part of a graphical user interface (GUI) of the web browser 108. Selection of the selectable control causes the tile 124 to be generated and displayed on the display 110. Generally, the tile 124 is a visual representation of the website 122, and is selectable to cause the website 122 to be displayed. For instance, the user may subsequently select the tile 124 to cause the web browser 108 to be launched (e.g., from a non-running state) and browsed to the website 122. The launching of the web browser 108 and the browsing to the website 122, for example, may occur automatically in response to a single user selection of the tile 124.

As further detailed below, creation of the tile 124 causes a notification channel to be generated that enables the website 122 to push notifications to the client device 102. For instance, notifications from the website 122 can cause various events to occur on the client device 102, such visual updates to the tile 124, a pop-up notification (e.g., a pop-up window, a "toast" notification, and so forth), and so on. According to various embodiments, the notification channel presents a secure way in which notifications can be pushed from various entities (e.g., the website 122) down to different client devices, such as the client device 102.

Having described an example environment in which the techniques described herein may operate, consider now some example implementation scenarios for enabling push notifications from websites in accordance with one or more embodiments.

Example Implementation Scenarios

The following section describes example implementation scenarios for enabling push notifications from websites in accordance with one or more embodiments. The implementation scenarios may be implemented in the environment 100 discussed above, and/or any other suitable environment.

Figure 2:
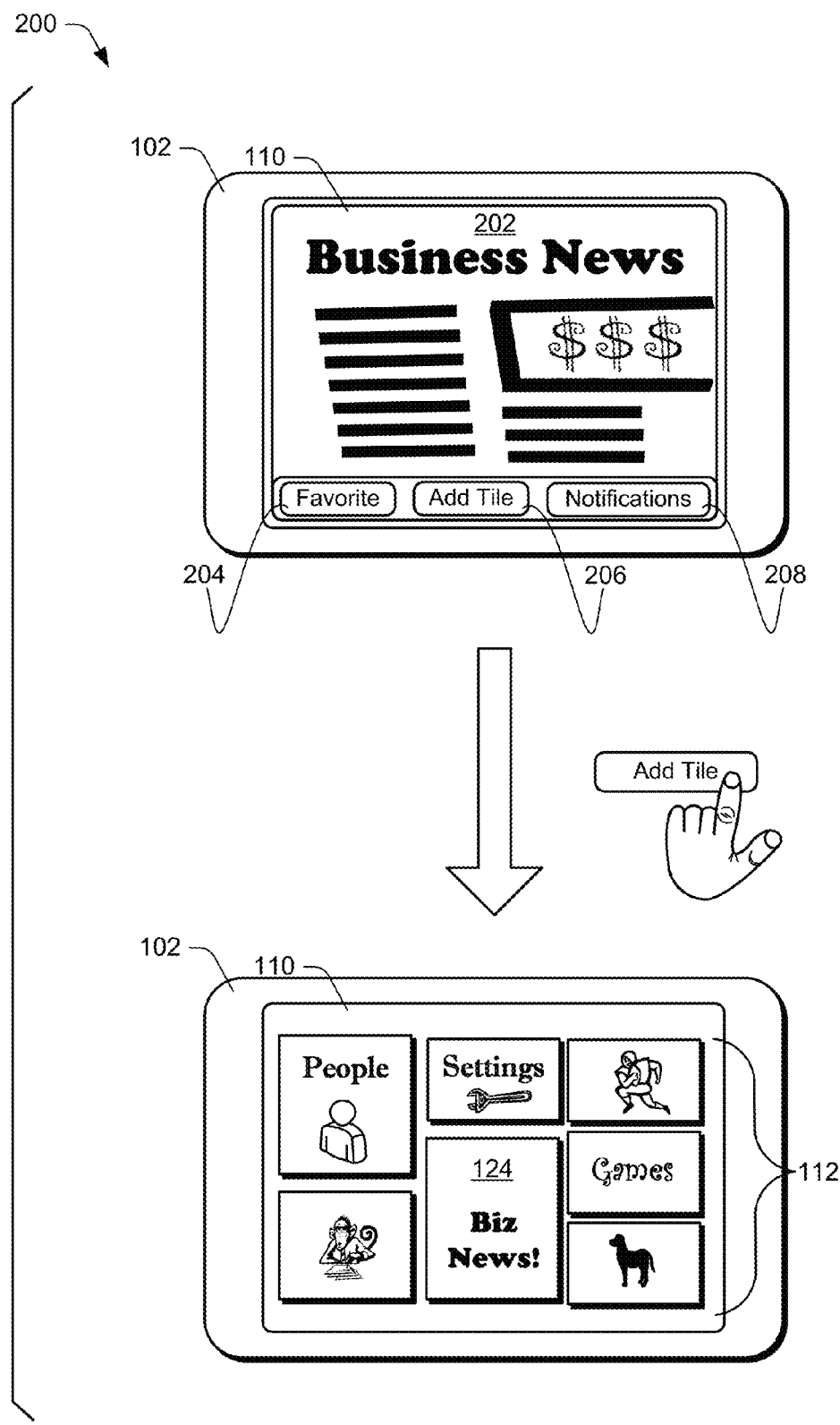
FIG. 2 illustrates an example implementation scenario in accordance with one or more embodiments.

FIG. 2 illustrates an example implementation scenario 200 for adding a tile for a web resource, such as for a website. The implementation scenario 200 includes the client device 102 with a webpage 202 displayed on the display 110. According to one or more embodiments, the webpage 202 represents a webpage for the website 122.

Further illustrated is a favorite control 204, an add tile control 206, and a notifications control 208. The favorite control 204 is selectable to add the website 122 to a list of favorites for a particular user and the add tile control 206 is selectable to generate a tile for the website 122. The notifications control 208 is selectable to subscribe to receiving notifications from the website 122. In at least some embodiments, selection of the notifications control 208 can subscribe the user to receiving notifications that are alternative or additional to updates to a tile.

According to one or more embodiments, the add tile control 206 and/or the notifications control 208 are displayed and/or activated in response to determining that the website 122 supports website notifications according to various embodiments discussed herein. For instance, markup and/or other code for the webpage 202 may include a tag (e.g., a custom HTML tag) that specifies that the website 122 supports push notifications. In at least some embodiments, if no indication that a website supports push notifications is identified (e.g., the custom HTML tag is not present), the add tile control may not be displayed or may be deactivated.

Continuing with the scenario 200, consider that a user selects the add tile control 206 while the webpage 202 is displayed. While the add tile control 206 is illustrated as being selected via touch input, it is to be appreciated that embodiments support a wide variety of input types, such as mouse/cursor selection, pen and/or stylus selection, touchless selection (e.g., via touchless gestures), and so forth.

In response to selection of the add tile control 206, the tile 124 is generated and displayed on the display 110. As referenced above, the tile 124 represents a visual representation of the website 122. The tile 124, for instance, is selectable to cause a navigation to the website 122 such that the webpage 202 and/or other webpage for the website 122 is displayed. In at least some embodiments, the tile 124 is manipulable such that the tile 124 can be repositioned in various positions relative to other of the tiles 112, can be resized to be larger or smaller, can be moved to different screens, and so forth. As further detailed herein, the tile 124 is dynamically updatable in response to various events. For instance, consider the following example scenarios.

Figure 3:
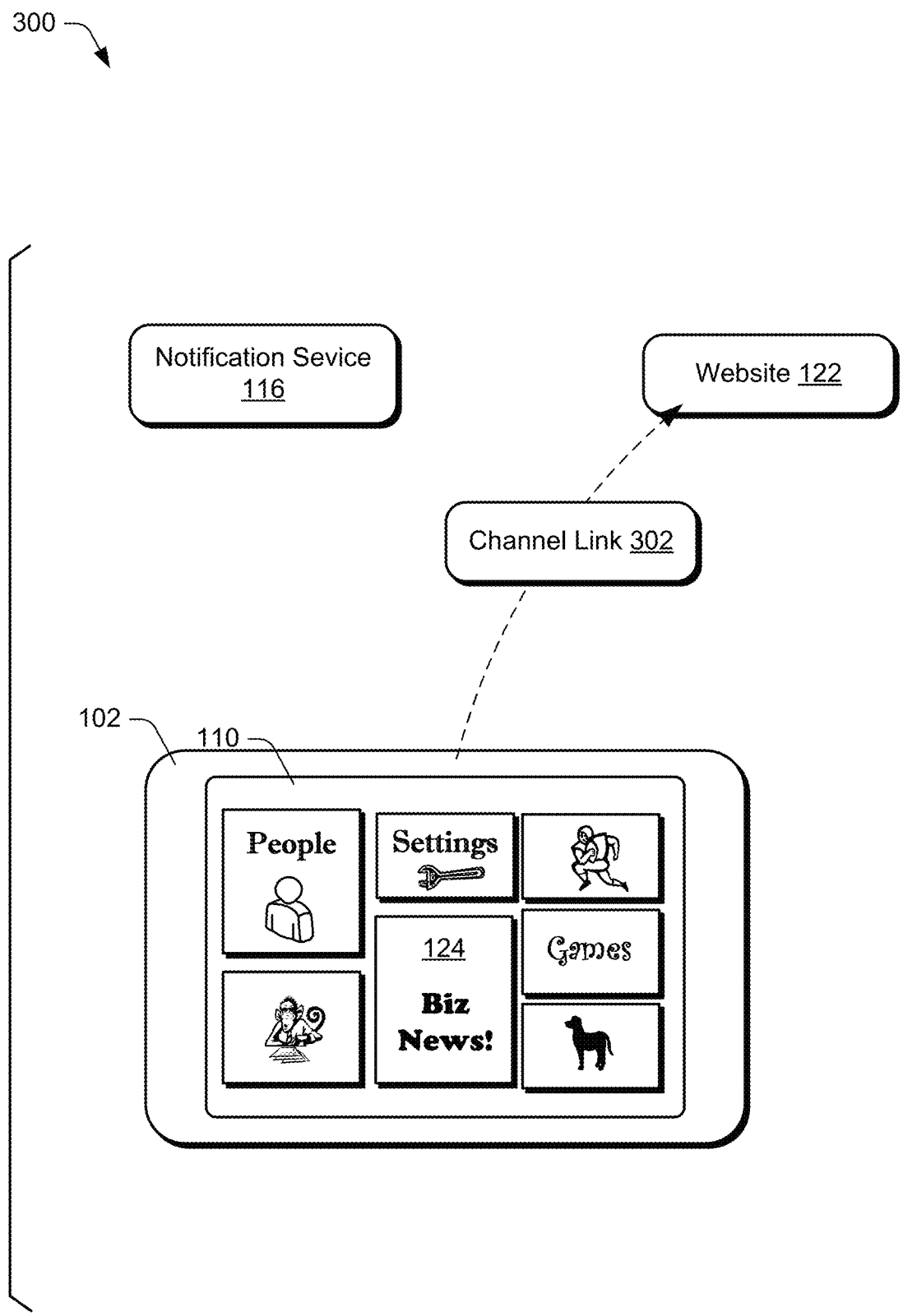
FIG. 3 illustrates an example implementation scenario in accordance with one or more embodiments.

FIG. 3 illustrates an example implementation scenario 300 for configuring a notification channel for routing notifications from the website 122 to the client device 102. In at least some embodiments, the scenario 300 occurs in response to a user choosing to receive push notifications from a website, such as in response to selection of the add tile control 206 and/or the notifications control 208 discussed above with reference to the scenario 200.

In the scenario 300, the client device 102 communicates a channel link 302 to the website 122. According to one or more embodiments, the channel link 302 includes information to enable the website 122 to identify the client device 102 and/or a user of the client device 102, as well as information that enables the website 122 to push notifications to the client device 102. Further details about generating and communicating channel links are presented below.

Figure 4:
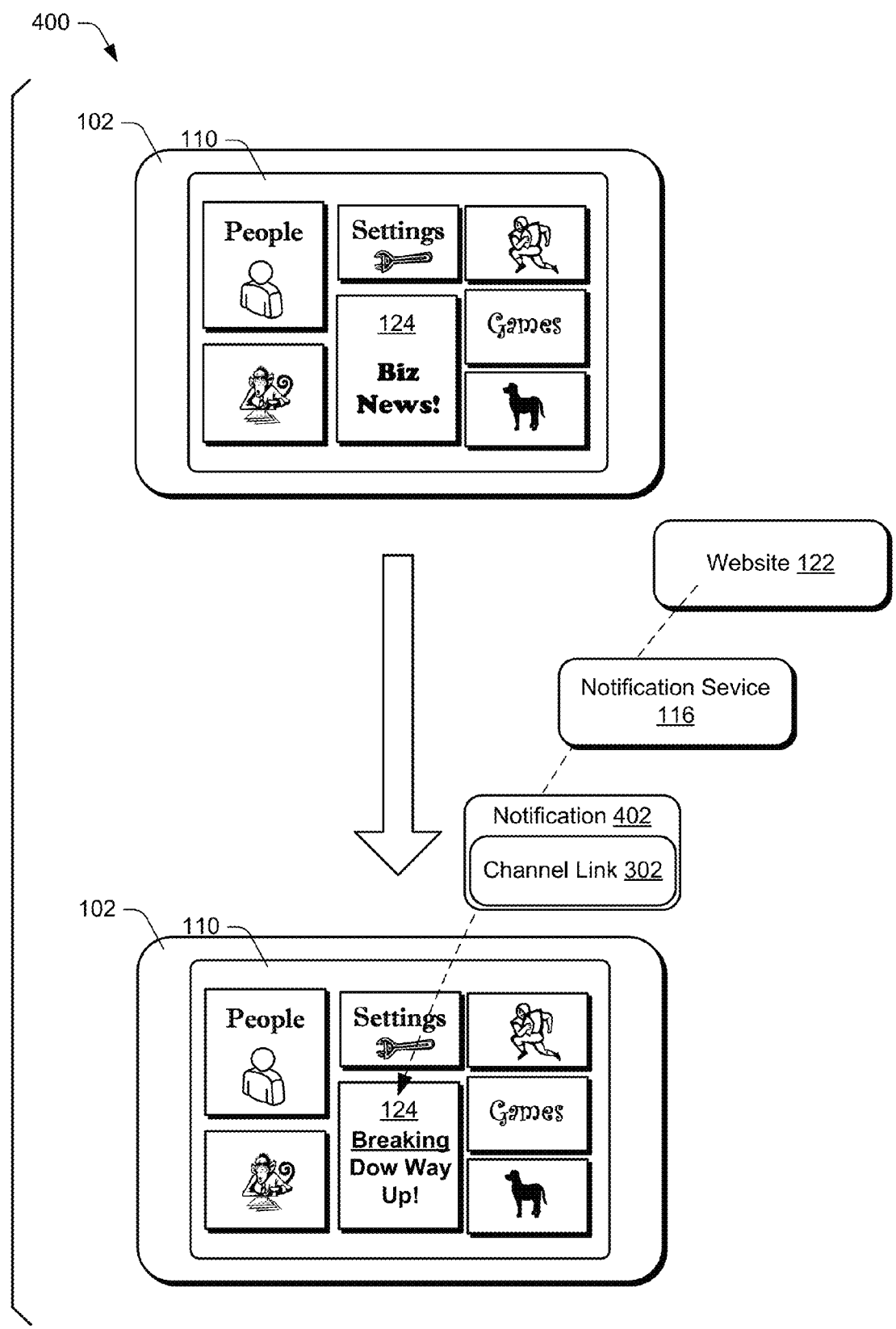
FIG. 4 illustrates an example implementation scenario in accordance with one or more embodiments.

FIG. 4 illustrates an example implementation scenario 400 for updating a tile in response to a notification from a website. The implementation scenario 400 includes the client device 102 with the tile 124 displayed on the display 110. Further to the scenario 400, the website 122 pushes a notification 402 to the notification service 116. The notification 402 includes the channel link 302 (introduced above), which enables the notification service 116 to identify the client device 102 such that the notification 402 can be routed to the correct device. The notification 402 further includes authentication and/or authorization information that enables the notification service 116 to determine whether the website 122 is authenticated and/or permitted to push notifications to the client device 102. Examples of such information are presented below.

Continuing with the scenario 400, information from the notification 402 is used to update to the visual content of the tile 124. For instance, the notification 402 includes breaking news that is displayed as part of the tile 124. The tile manager module 114, for example, can process the notification 402 and cause visual updates from the notification 402 to be propagated to the tile 124. Thus, in at least some embodiments, notifications can be displayed on a device separately and distinctly from a display of an associated website. According to one or more embodiments, a user can select the tile 124 to navigate to the website 122 (e.g., the webpage 202) and view information about the notification 402, such as further details about a news story that spawned the notification 402.

As referenced above, tile updates are simply one example of a notification scenario that can implement embodiments discussed herein, and a wide variety of other notification types and instances are supported in accordance with one or more embodiments.

Having discussed some example implementation scenarios, consider now a discussion of some example procedures in accordance with one or more embodiments.

Example Procedures

The following discussion describes some example procedures for enabling push notifications from websites in accordance with one or more embodiments. The example procedures may be employed in the environment 100 of FIG. 1, the system 1500 of FIG. 15, and/or any other suitable environment. In at least some embodiments, the steps described for the various procedures can be implemented automatically and independent of user interaction. For instance, the procedures can be employed to perform various aspects of the implementation scenarios discussed above.

Figure 5:
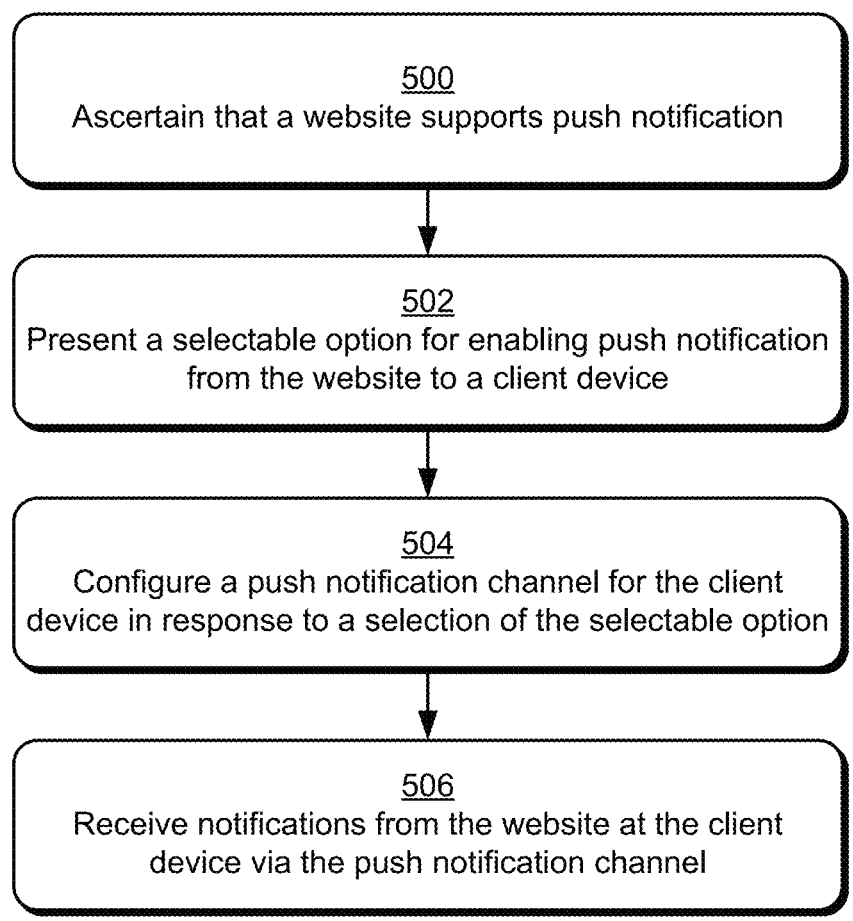
FIG. 5 is a flow diagram that describes steps in a method for subscribing to push notifications from a website in accordance with one or more embodiments.

FIG. 5 is a flow diagram that describes steps in a method in accordance with one or more embodiments. The method describes an example procedure for subscribing to push notifications from a website in accordance with one or more embodiments.

Step 500 ascertains that a website supports push notification. For instance, markup and/or other code included as part of a webpage for the website may indicate that the website supports push notifications. As one example, a custom markup tag included in the webpage's markup may identify the push notification functionality such that when the markup is parsed, the tag is identified as indicating support for push notification.

One example of such a custom tag is: https://website/path/?channelToken=<channelToken>

Alternatively or additionally, the custom tag may include a uniform resource locator (URL) to a document (e.g., an extensible markup language (XML) document) that describes push notification support information and/or procedures. In such embodiments, the client device 102 and/or the notification service 116 may follow the URL and access the document to obtain further information about the website and/or the website's push notification specifications. According to one or more embodiments, the custom tag includes other types of information, examples of which are discussed below.

Step 502 presents a selectable option for enabling push notification from the website to a client device. The selectable option, for instance, can be implemented as a selectable control that is displayed in response to ascertaining that the website supports push notifications. Various types and instances of selectable options can be employed, such as the add tile control 206 and the notifications control 208 introduced above with reference to FIG. 2.

Step 504 configures a push notification channel for the client device in in response to a selection of the selectable option. Generally, the push notification channel represents a collection of procedures and communication attributes that enable secure routing of notifications from a website and/or other web resource, to a client device. Detailed attributes of a push notification channel are presented below.

In at least some embodiments, a tile for the website is generated in response to a selection of the selectable control. For instance, in response to a user selection of the add tile control 206, a tile visual can be generated and displayed that represents the website. In at least some embodiments, one or more portions of the tile can be received from the website, such as content to be used to populate the tile. As indicated above, selection of the tile can cause a webpage for the website to be displayed, such as via navigation to the website via a web browser and/or other web-enabled functionality.

Step 506 receives notifications from the website at the client device via the push notification channel. According to one or more embodiments, notifications are pushed from the website to the client device independent of a user navigation to and/or interaction with the website. For instance, subsequent to the push notification channel being configured, the website may initiate a push notification to the client device without the user expressly requesting the notification. Further, a push notification may be pushed from a website to the client device via the push notification channel and displayed on the client device even when the website is not being displayed on the client device, and/or a web browser is not currently open on the client device. Thus, in at least some embodiments, the push notification channel represents a way for a website to push notifications to a user's device even while the user is engaged in other activities not directly related to the website.

Further, once the push notification channel is configured, a website may utilize the push notification channel over a period of time (e.g., days, weeks, months, and so on) to route notifications to a client device. Thus, in at least some embodiments, the push notification channel represents a set of attributes and procedures that persist, e.g., for a specified period of time or until the push notification channel expires or is revoked. Accordingly, a push notification channel may be reused to push multiple types and instances of notifications from a website to a client device. For instance, various types of notifications can be routed to a client device, such as updates to a tile for the website, pop-up notifications, toast notifications, audio notifications, and so forth. Various implementation details for the push notification channel are now presented.

Figure 6:
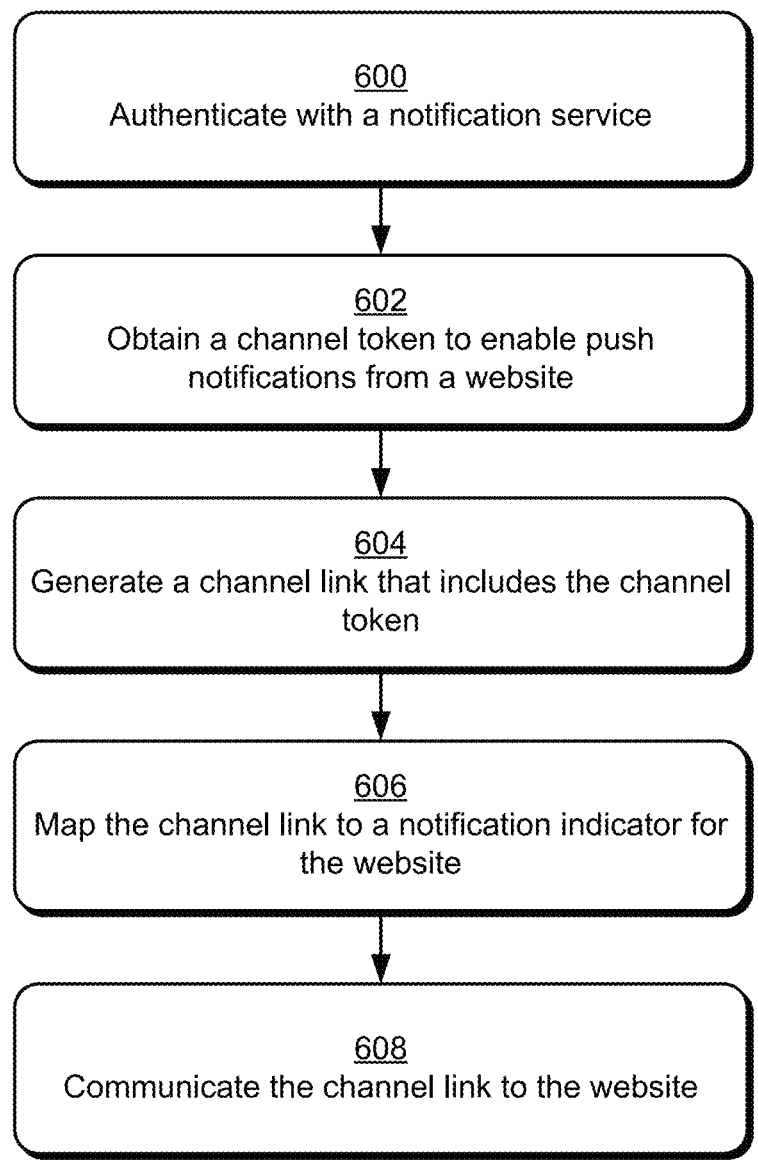
FIG. 6 is a flow diagram that describes steps in a method for generating a channel link and providing the channel link to a website in accordance with one or more embodiments.

FIG. 6 is a flow diagram that describes steps in a method in accordance with one or more embodiments. The method describes an example procedure for generating a channel link and providing the channel link to a website in accordance with one or more embodiments. In at least some embodiments, the method can be performed automatically in response to a user requesting push notifications from a web resource, as discussed above.

Step 600 authenticates with a notification service. The client device 102, for instance, authenticates with the notification service 116, such as via a secure login procedure. As part of the authentication, a unique identifier for the client device 102 is provided to or generated by the notification service 116. In at least some embodiments, the authentication links the client device 102 to a trusted user and/or device account, such as with an enterprise entity that manages and/or sponsors the notification service.

Step 602 obtains a channel token to enable push notifications from a website. The tile manager module 114, for instance, can request a channel token from the notification service 116. Generally, the channel token represents a data structure that identifies a particular device (e.g., the client device 102), identifies a website (e.g., the website 122), and provides an indication that the client device has subscribed to receive push notifications from the website. The channel token, for instance, includes an identifier for the client device 102. Examples of suitable identifiers include a media access control (MAC) address, a uniquely allocated hardware identifier (e.g., generated by the notification service 116), and so forth. Further, the channel token includes an identifier for the website, such as a domain name (e.g., a fully qualified domain name (FQDN), (other examples).

In at least some embodiments, the notification service 116 receives this information from the client device 102 and generates a channel token that includes this information. Alternatively or additionally, some of the information for the channel token is generated by the notification service 116, such as the identifier used to identify the client device 102. According to one or more embodiments, a device identifier included in the channel token can be used by the notification service 116 to reference locally stored information for further identifying the device 102, and/or a website the is permitted to push notifications via an associated notification channel.

As detailed below, the channel token may further include security-related information that enables a notification service and/or a client device to ascertain whether a website that is utilizing the channel token to send a push notification is authorized to send push notifications. The notification service 116 then returns the channel token to the client device 102.

Step 604 generates a channel link that includes the channel token. Generally, the channel link is representative of information that can be used to route notifications from a website to a target device. The channel link, for instance, can be implemented as a uniform resource locator (URL) that includes the channel token, as well as other information.

According to one or more embodiments, information included in the channel link includes information from a tag obtained from the website, such as the custom tag discussed above with reference to FIG. 5. The channel link, for example, includes a domain name, URL, and/or identifier for the website. The channel link may be generated to include various other types of information, such as an identifier for a device subscribing to push notification from the website, user credentials for a user of the client device, and so forth.

Step 606 maps the channel link to a notification indicator for the website. For instance, the tile manager module 114 can map the channel link to a mechanism for presenting notifications from the website 122, e.g., to the tile 124. In at least some embodiments, this mapping enables notifications from the website to be presented in an appropriate manner, such as via updates to a website tile. As discussed elsewhere herein, various other types of notification indicators may be alternatively or additionally employed.

Step 608 communicates the channel link to the website. The client device 102, for instance, uploads the channel link to the website 122. According to one or more embodiments, the website can utilize the channel link to push notifications to the notification indicator such that the notifications can be output (e.g., displayed) on a client device. The channel link can be communicated using a variety of different techniques, examples of which are presented later in the discussion below.

Figure 7:
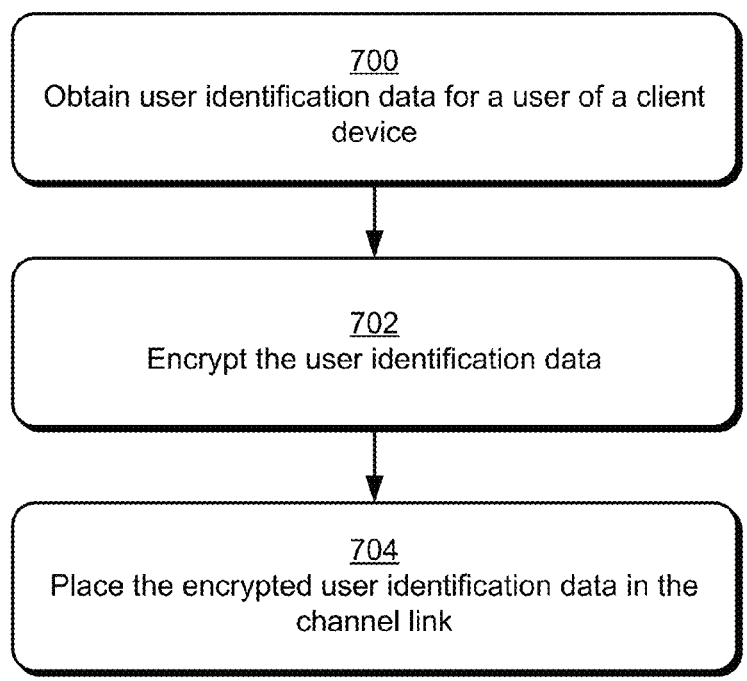
FIG. 7 is a flow diagram that describes steps in a method for associating a user identity with a channel link in accordance with one or more embodiments.

FIG. 7 is a flow diagram that describes steps in a method in accordance with one or more embodiments. The method describes an example way of associating a user identity with a channel link in accordance with one or more embodiments.

Step 700 obtains user identification data for a user of a client device. Various types of user identification data may be utilized, such as a username, an address for the user's device, and so forth. In at least some embodiments, the user identification data can include and/or be obtained from a cookie for a particular website. For instance, when a user browses to the website, the cookie can be stored locally on the user's device. A cookie typically has some form of user identification data embedded in the cookie, and thus can be used by the website to identify a particular user and/or user device.

Step 702 encrypts the user identification data. According to one or more embodiments, the user identification data can be encrypted using any suitable encryption technique.

Step 704 places the encrypted user identification data in the channel link. The encrypted user identification data, for instance, can be placed as part of a query parameter used to communicate the channel link to the website. Further details concerning communication of channel links are presented below.

According to various embodiments, a website has access to decryption procedures (e.g., a decryption key) that may be utilized to decrypt the encrypted user identification data. Thus, when the website receives the channel link, the website may decrypt the encrypted user identification data and thus identify the user. For instance, the website may match the user identification data to an existing user account maintained by the website.

Thus, notifications from the website may be personalized to the user, such as based on information known from the user's account. For instance, notifications from a website can be tailored based on a user's preferences, a user's location, a user's browsing and/or purchase history, a user's friends (e.g., in a social media environment), and so forth.

Figure 8:
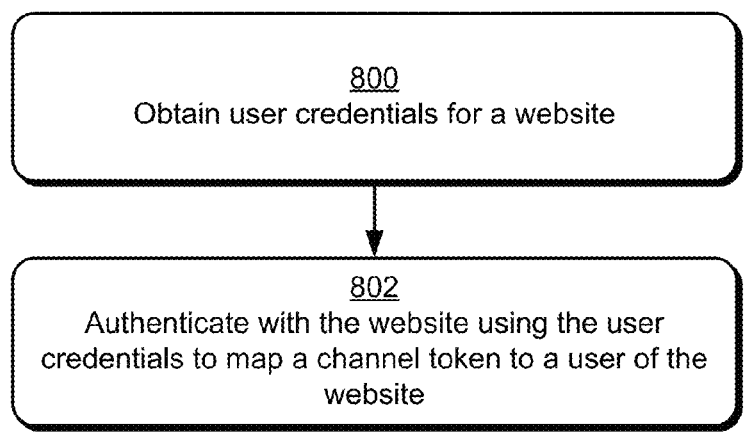
FIG. 8 is a flow diagram that describes steps in a method for associating a user identity with a channel link in accordance with one or more embodiments.

FIG. 8 is a flow diagram that describes steps in a method in accordance with one or more embodiments. The method describes an example way of associating a user identity with a channel link in accordance with one or more embodiments.

Step 800 obtains user credentials for a website. For instance, a username and password for a user account with a website are obtained. In at least some embodiments, a user is prompted (e.g., via a graphical user interface (GUI)) to provide their credentials.

Step 802 authenticates with the website using the user credentials to map a channel token to a user of the website. For instance, the user credentials are embedded in the channel link such that the credentials can be used by the website to authenticate and identify the user. A username and password for the user, for example, are embedded in the channel link prior to the channel link being communicated to the website. As discussed below, the channel link can be securely communicated to the website, such as via Hypertext Transfer Protocol Secure (HTTPS). Thus, user credentials included in the channel link can be protected from unauthorized access.

As another example, the client device 102 can utilize the user credentials to authenticate with a $3^{rd}$ party authorization service, e.g., that supports a particular authorization protocol and/or protocols. OAuth is one example of such a protocol and/or standard that may be employed. Any suitable authorization protocol may be utilized, however.

Once authenticated with the $3^{rd}$ party authorization service, the authorization service provides an authorization token that identifies the user. The authorization token can be embedded into a channel link to enable a website that receives the channel link to ascertain, based on the authorization token, the identity of the user and that the channel link has been successfully authenticated with a trusted authorization service.

Having discussed some example methods for associating a user identity with a channel link, consider now some example procedures for communicating a channel link to a website in accordance with one or more embodiments.

Figure 9:
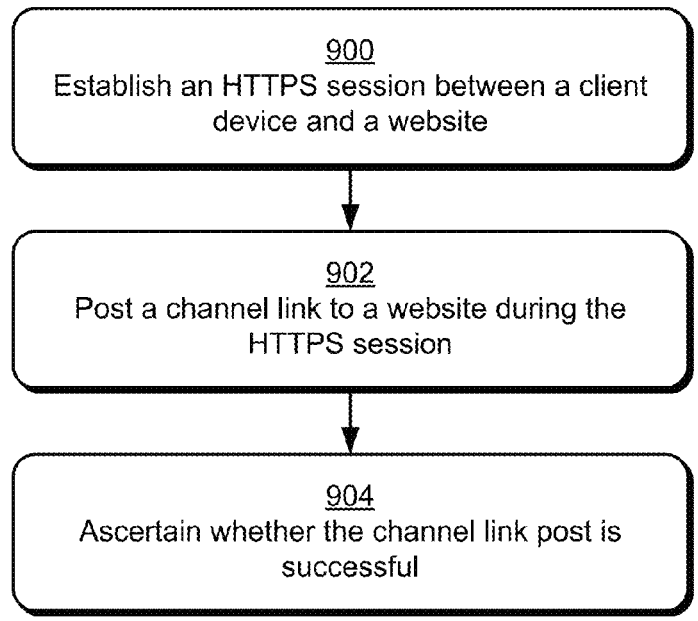
FIG. 9 is a flow diagram that describes steps in a method for communicating a channel link to a website in accordance with one or more embodiments.

FIG. 9 is a flow diagram that describes steps in a method in accordance with one or more embodiments. The method describes an example way of communicating a channel link to a website in accordance with one or more embodiments. For instance, the method describes an example implementation of step 606, discussed above with reference to FIG. 6. In at least some embodiments, the method can be implemented at least in part at the client device 102.

Step 900 establishes an HTTPS session between a client device and a website. For instance, the client device 102 establishes an HTTPS session with the website 122.

According to one or more embodiments, establishing an HTTPS session with a website involves obtaining a certificate from the website, such as a secure sockets layer (SSL) certificate. The certificate can then be verified to ensure that the certificate is issued by a trusted entity, such as a trusted certificate authority. If the certificate is verified, the HTTPS session may continue. Otherwise, if there is a problem with the certificate (e.g., the issuing authority is unknown and/or untrusted), the HTTPS session can terminate without sending the channel link to the website.

Step 902 posts a channel link to a website during the HTTPS session. In at least some embodiments, a channel link can be uploaded to a website using Representational state transfer (REST) as the upload communication protocol. For instance, the channel link can be communicated to the website during the HTTPS session via a Hypertext Transfer Protocol (HTTP) POST request to the website. The channel link (which, as discussed above, includes the channel token as well as other types of information) is included in the body of the POST request.

Step 904 ascertains whether the channel link post is successful. For instance, the website can respond with an HTTP status code that indicates whether the POST of the channel link to the website succeeded or failed.

Figure 10:
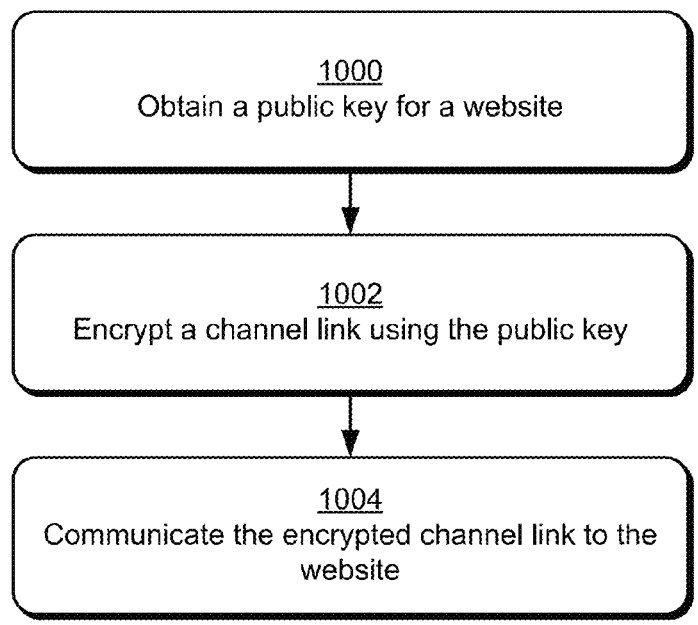
FIG. 10 is a flow diagram that describes steps in a method for communicating a channel link to a website in accordance with one or more embodiments.

FIG. 10 is a flow diagram that describes steps in a method in accordance with one or more embodiments. The method describes another example procedure for communicating a channel link to a website in accordance with one or more embodiments.

Step 1000 obtains a public key for a website. The client device 102, for instance, obtains a certificate (e.g., an SSL certificate) from the website 122 that includes a public key. The certificate may be obtained in various ways, such as via an HTTPS session between the client device 102 and the website 122.

Step 1002 encrypts a channel link using the public key. The various information included as part of the channel link, for instance, is encrypted with the public key.

Step 1004 communicates the encrypted channel link to the website. The encrypted channel link may be communicated via a standard POST request, e.g., an HTTP post that does not utilize HTTPS security procedures. In at least some embodiments, this provides a streamlined way of communicating a channel link to a website that avoids some of the resource overhead associated with the HTTPS protocol.

According to various embodiments, the website receives the encrypted channel link and decrypts the channel link with its private key that is paired to the public key used to encrypt the channel link. The website may then utilize the decrypted channel link to push notifications to a client device, as detailed elsewhere herein. For instance, consider the following example procedures for pushing notifications from a website to a client device.

Figure 11:
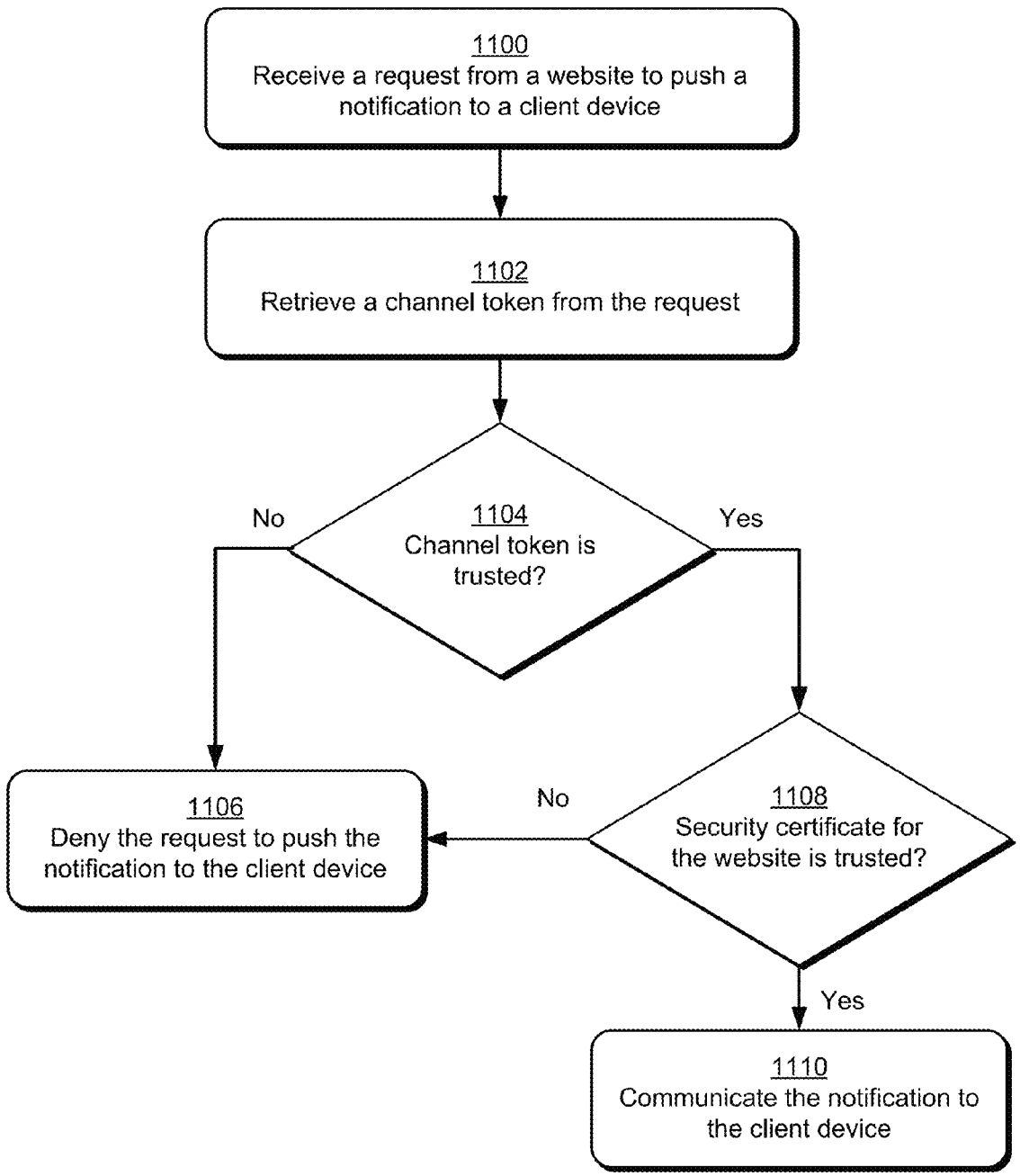
FIG. 11 is a flow diagram that describes steps in a method for enabling a notification to be pushed from a website to a client device in accordance with one or more embodiments.

FIG. 11 is a flow diagram that describes steps in a method in accordance with one or more embodiments. The method describes an example procedure for enabling a notification to be pushed from a website to a client device.

Step 1100 receives a request from a website to push a notification to a client device. For instance, the notification service 116 receives a request from the website 122 to push a notification to the client device 102. In at least some embodiments, the request can include a request to establish a two-way authentication session between the website and a notification server, e.g., between the website 122 and the notification service 116. Various types of two-way authentication may be employed, such as mutual transport layer security (TLS), mutual SSL, and so forth.

Alternatively or additionally, the request can be part of an HTTPS session between the website and a notification service. For instance, the notification service 116 can specify that HTTPS is to be used when pushing notifications to a client device. Thus, as discussed below, a certificate and/or signature received from the website during the HTTPS session can be used ascertain that the website that is sending the notification is authenticated, and that a push notification has not been tampered with, e.g., by a malicious website or other unauthorized entity.

Step 1102 retrieves a channel token from the request. The request, for instance, can be parsed to locate a channel token. Example details concerning channel tokens are discussed above.

Step 1104 determines whether the channel token is trusted. Example ways of determining whether a channel token is trusted are presented below.

If the channel token is not trusted ("No"), step 1106 denies the request to push the notification to the client device. If the channel token is trusted ("Yes"), step 1108 ascertains whether a security certificate for the website is trusted. For instance, the notification service 116 can determine whether the website's certificate is signed by a certification authority that is trusted by the notification service 116. In at least some embodiments, a full certificate chain, only part of the certificate chain, or only the root certificate authority may be checked. Alternatively or additionally, a domain name (e.g., an FQDN) from a subject field of the security certificate can be compared to the domain name of the website. If the domain name of the website (e.g., the top level domain) does not match the domain name from the security certificate, the website and/or the security certificate can be determined to be untrusted.

If the security certificate is not trusted ("No"), step 1106 denies the request to push the notification to the client device. For instance, the security certificate may be untrusted if the certificate is not signed, or is signed by a certification authority that is unknown and/or untrusted by the notification service 116.

If the security certificate is trusted ("Yes"), step 1110 communicates the notification to the client device. As discussed above, the notification can include various information from the website, such as updates for tile content and/or other forms of notifications that can be presented on a client device. For instance, in at least some embodiments, the notification may include a deep link to a particular page of the website. In such embodiments, the domain of a deep link received in a notification may be compared (e.g., by the tile manager module 114) to a domain of the website associated with the tile to ensure that the deep link is from an authorized website.

In at least some embodiments, the method described above is initiated and/or performed independent of a user navigating to a website and/or a website being displayed on the client device. Further, the website can initiate communication of the notification to the client device such that the notification can be presented independent of the website being displayed, and/or even if a web browser is not currently running on the client device.

In at least some embodiments, if the client device is not online when the notification is communicated from the notification service, the notification service can cache the notification. Thus, once the client device comes online, the notification can be communicated from the cache to the client device. Consider now some example procedures for determining whether a channel token is trusted.

Figure 12:
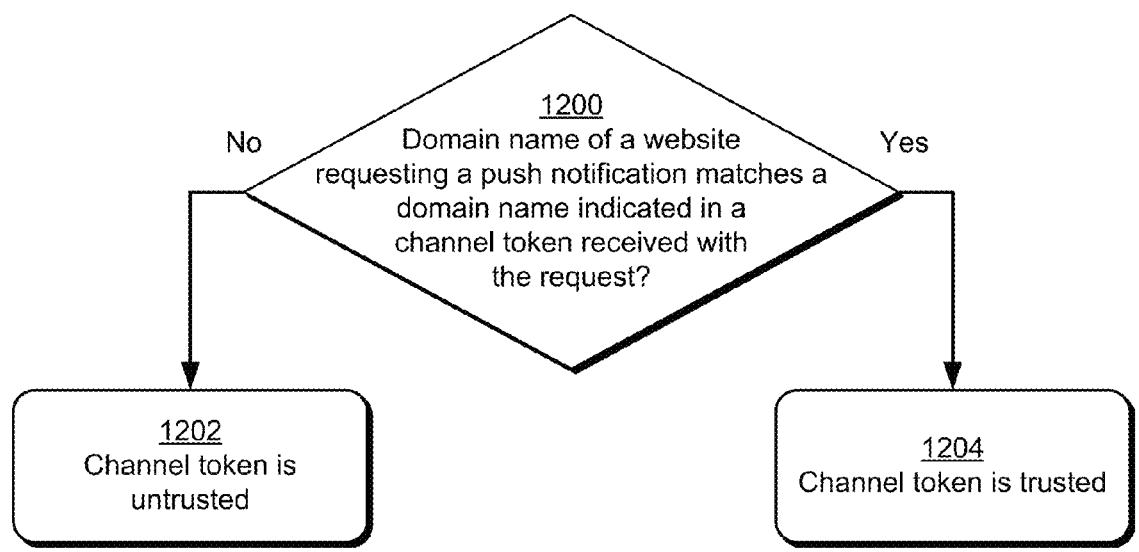
FIG. 12 is a flow diagram that describes steps in a method for determining whether a channel token is trusted in accordance with one or more embodiments.

FIG. 12 is a flow diagram that describes steps in a method in accordance with one or more embodiments. The method describes an example procedure for determining whether a channel token is trusted, such as discussed above with reference to step 1104 of FIG. 11.

Step 1200 determines whether a domain name of a website requesting a push notification matches a domain name indicated in a channel token received with the request.

As discussed above, a domain name (e.g., an FQDN) for a website can be embedded into a channel token, which in turn is embedded into a channel link prior to communicating the channel link to the website.

If the domain name indicated in the channel token does not match the domain name of the website ("No"), step 1202 determines that the channel token is untrusted.

If the domain name indicated in the channel token matches the domain name of the website ("Yes"), step 1204 determines that the channel token is trusted.

Figure 13:
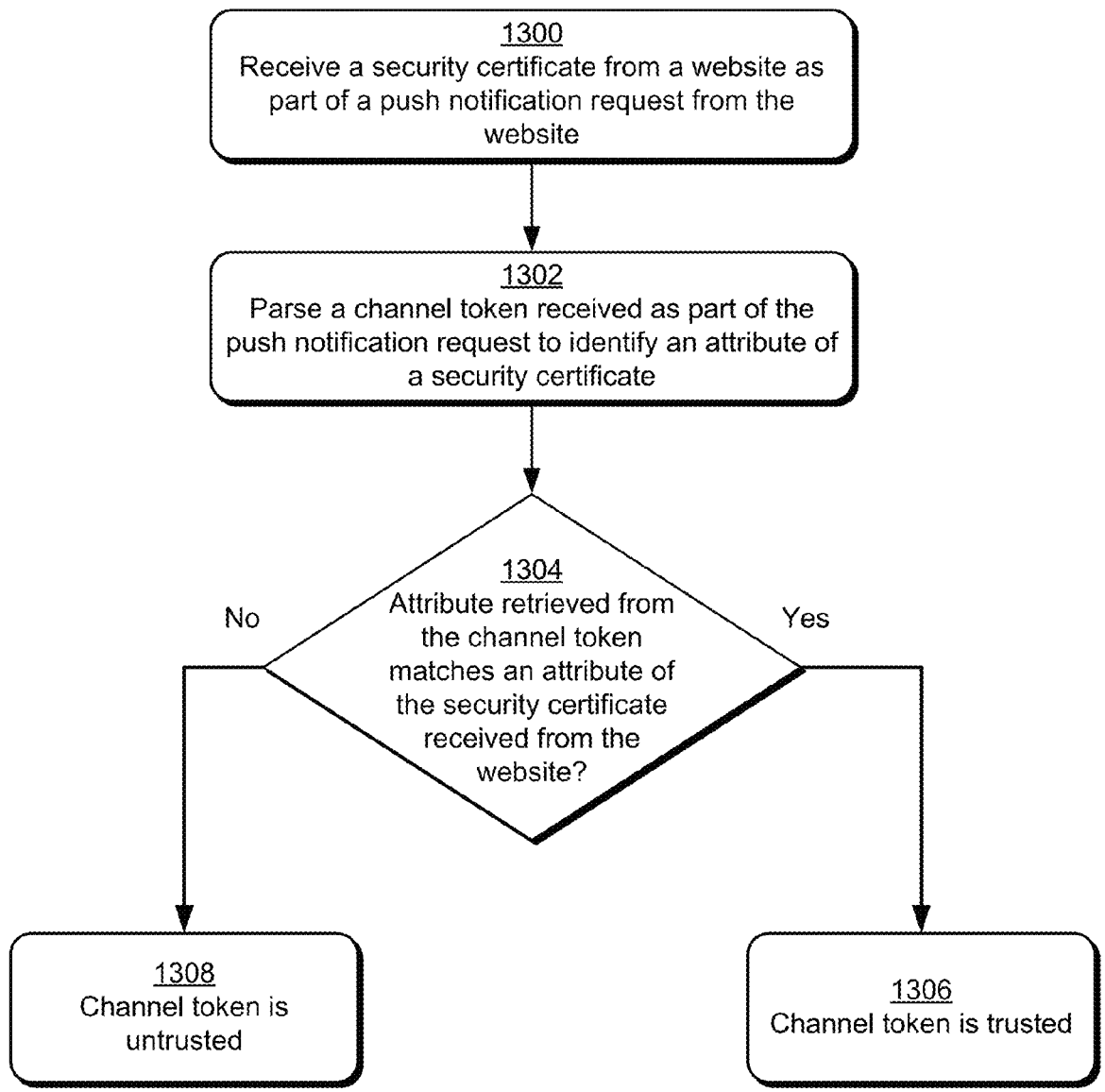
FIG. 13 is a flow diagram that describes steps in a method for determining whether a channel token is trusted in accordance with one or more embodiments.

FIG. 13 is a flow diagram that describes steps in a method in accordance with one or more embodiments. The method describes another example procedure for determining whether a channel token is trusted, such as discussed above with reference to step 1104 of FIG. 11.

Step 1300 receives a security certificate from a website as part of a push notification request from the website. For instance, an SSL certificate is received from the website as part of an HTTPS session between the website and a notification service, e.g., between the website 122 and the notification service 116.

Step 1302 parses a channel token received as part of the push notification request to identify an attribute of a security certificate. Examples of such an attribute include a subject field (e.g., information from a subject field), a thumbprint, and so forth. In at least some embodiments, a subject field is not limited to a particular certificate, and can be used for multiple certificates that are issued by a trusted certificate authority. A thumbprint, for instance, is a representation of the website's security certificate that can be generated in various ways. For example, the thumbprint represents a hash of the website's security certificate that is generated by applying a hashing function to the certificate. In at least some embodiments, various other attributes of security certificates may be utilized.

Step 1304 ascertains whether the attribute retrieved from the channel token matches an attribute of the security certificate received from the website. For instance, subject field information retrieved from the channel token can be compared to a subject field of a security certificate. As an alternative or additional example, a hashing function can be applied to the security certificate received from the website to generate a thumbprint for the certificate.

If the attribute retrieved from the channel token matches the attribute of the security certificate received from the website ("Yes"), step 1306 determines that the channel token is trusted. For instance, the subject field information and/or the thumbprint retrieved from the channel token matches the subject field and/or the thumbprint of the security certificate received from the website.

If the thumbprint retrieved from the channel token does not match the thumbprint of the security certificate received from the website ("No"), step 1308 determines that the channel token is untrusted. For instance, the subject field information and/or the thumbprint retrieved from the channel token does not match the subject field and/or the thumbprint of the security certificate received from the website.

As an alternative and/or optional extension of the methods discussed above, a website may authenticate with a $3^{rd}$ party authorization service, examples of which are discussed above. The authorization service, for instance, may be hosted by a notification service, or may represent a separate authorization service that is trusted by the notification service. In response to a successful authentication with the authorization service, the website receives an authorization token from the authorization service. The website may then utilize the authorization token to authenticate with the notification service to permit a notification from the website to be pushed to a client device served by the notification service.

As an example implementation, consider that an enterprise hosts an online store with which a website may authenticate and receive a security certificate. When the website has a notification to push to a client device, the website may present the security certificate to the online store, which validates the security certificate and provides an authorization token (e.g., an OAuth token) to the website. The website may then present the authorization token to a notification service to indicate that the website is authorized to push notifications to a client device and/or group of client devices. As referenced above, this may be used on top of the example methods discussed above (e.g., with reference to FIGS. 11-13), or may be used as an alternative authentication method.

In at least some embodiments, a channel token may expire based on various events. For instance, a channel token may be issued with an expiration date and/or an expiration time period such that after a certain date or elapsed time, the channel token is no longer valid. For instance, the notification service 116 may not recognize an expired token as being valid for purposes of communicating a notification from a website to a client device. According to one or more embodiments, when a channel token is expired, various procedures may be employed to refresh and/or renew the channel token. Consider, for example, the following example procedure.

Figure 14:
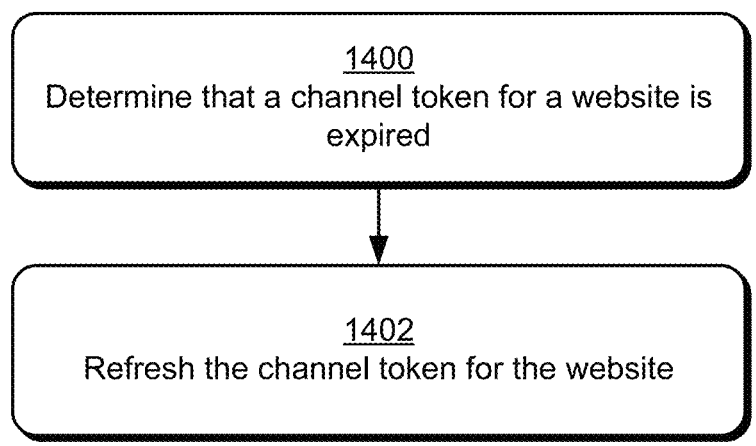
FIG. 14 is a flow diagram that describes steps in a method for renewing an expired channel token in accordance with one or more embodiments.

FIG. 14 is a flow diagram that describes steps in a method in accordance with one or more embodiments. The method describes an example procedure for renewing an expired channel token.

Step 1400 determines that a channel token for a website is expired. Expiry of a channel token may be determined in a variety of ways. For instance, when a user browses to the website, the tile manager module 114 and/or other functionality may query the website to determine whether its channel token is expired. As another example, when a website attempts to push a notification to a client device, the notification service 116 may ascertain that a channel token included with the push notification request is expired. Various other ways of determining that a channel token is expired may be employed, however.

Step 1402 refreshes the channel token for the website. For instance, a new channel token for the website can be generated, such as by the notification service 116. In at least some embodiments, the procedure discussed above with reference to FIG. 6 may be employed to generate a new channel token and/or a new channel link for the website, and the communicate the new channel token and/or channel link to the website. The new channel token and/or new channel link may be utilized by the website to push notifications to a client device.

While the example procedure above discusses that a channel token is refreshed in response to expiration of a channel token, at least some embodiments may refresh a channel token independent of an indication that the channel token is expired. For instance, a periodic channel token refresh procedure may be implemented that refreshes a channel token regardless of whether the channel token is expired.

According to one or more embodiments, a channel token may be revoked. For instance, a website's channel token may be revoked in response to an indication that the website is no longer trusted. As another example, a user may decide that the user no longer wishes to receive push notifications from a website, and thus may unsubscribe from receiving such push notifications. For instance, a user may remove (e.g., "unpin") a website's tile to indicate that the user no longer wishes to receive push notifications from the website. In at least some embodiments, a user may remove a tile via interaction with the tile itself.

In response to the user unsubscribing, the website's channel token can be revoked such that notifications are no longer pushed from the website to the user's device. For instance, the notification service 116 can be notified that the website's channel token is revoked, and thus may prevent push notifications from the website from being forwarded to the client device 102.

Having discussed some example procedures, consider now a discussion of an example system and device in accordance with one or more embodiments.

Example System and Device

Figure 15:
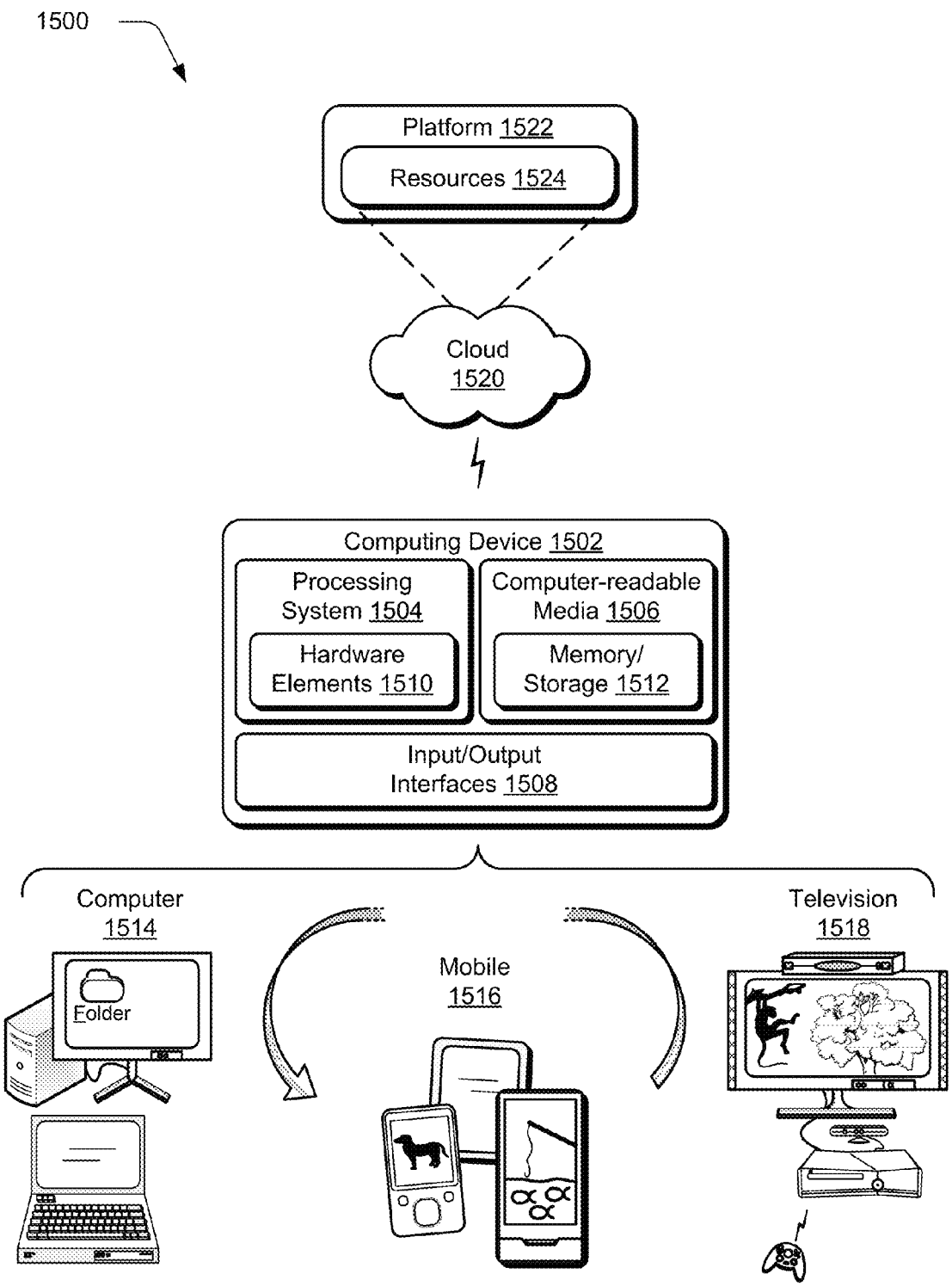
FIG. 15 illustrates an example system and computing device as described with reference to FIG. 1, which are configured to implement embodiments of techniques described herein.

FIG. 15 illustrates an example system generally at 1500 that includes an example computing device 1502 that is representative of one or more computing systems and/or devices that may implement various techniques described herein. For example, the client device 102 and/or the notification service 116 discussed above with reference to FIG. 1 can be embodied as the computing device 1502. The computing device 1502 may be, for example, a server of a service provider, a device associated with the client (e.g., a client device), an on-chip system, and/or any other suitable computing device or computing system.

The example computing device 1502 as illustrated includes a processing system 1504, one or more computer-readable media 1506, and one or more Input/Output (I/O) Interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage 1512 may include volatile media (such as random access memory (RAM)) and/or nonvolatile media (such as read only memory (ROM), Flash memory, optical disks, magnetic disks, and so forth). The memory/storage 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1510 and computer-readable media 1506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of modules that are executable by the computing device 1502 as software may be achieved at least partially in hardware, e.g., through use of computer-readable storage media and/or hardware elements 1510 of the processing system. The instructions and/or functions may be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1514, mobile 1516, and television 1518 uses. Each of these configurations includes devices that may have generally different constructs and capabilities, and thus the computing device 1502 may be configured according to one or more of the different device classes. For instance, the computing device 1502 may be implemented as the computer 1514 class of a device that includes a personal computer, desktop computer, a multi-screen computer, laptop computer, netbook, and so on.

The computing device 1502 may also be implemented as the mobile 1516 class of device that includes mobile devices, such as a mobile phone, portable music player, portable gaming device, a tablet computer, a multi-screen computer, and so on. The computing device 1502 may also be implemented as the television 1518 class of device that includes devices having or connected to generally larger screens in casual viewing environments. These devices include televisions, set-top boxes, gaming consoles, and so on.

The techniques described herein may be supported by these various configurations of the computing device 1502 and are not limited to the specific examples of the techniques described herein. For example, functionalities discussed with reference to the tile manager module 114, the notification service 116, and/or the web resources 118 may be implemented all or in part through use of a distributed system, such as over a "cloud" 1520 via a platform 1522 as described below.

The cloud 1520 includes and/or is representative of a platform 1522 for resources 1524. The platform 1522 abstracts underlying functionality of hardware (e.g., servers) and software resources of the cloud 1520. The resources 1524 may include applications and/or data that can be utilized while computer processing is executed on servers that are remote from the computing device 1502. Resources 1524 can also include services provided over the Internet and/or through a subscriber network, such as a cellular or Wi-Fi network.

The platform 1522 may abstract resources and functions to connect the computing device 1502 with other computing devices. The platform 1522 may also serve to abstract scaling of resources to provide a corresponding level of scale to encountered demand for the resources 1524 that are implemented via the platform 1522. Accordingly, in an interconnected device embodiment, implementation of functionality described herein may be distributed throughout the system 1500. For example, the functionality may be implemented in part on the computing device 1502 as well as via the platform 1522 that abstracts the functionality of the cloud 1520.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for enabling push notifications from websites are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
presenting a selectable option for adding a tile that represents a website for display on a client device;
configuring, via one or more computing devices, a push notification channel for the client device in response to a selection of the selectable option to add the tile thereby enabling push notification from the website to the tile, said configuring the push notification including obtaining a channel token that enables a notification to be pushed to the client device, and communicating the channel token to the website;
receiving a push notification from the website at the client device via the push notification channel and independent of a user navigating to the website or having a browser open; and
populating the push notification to the tile.

2. A computer-implemented method as recited in claim 1, wherein said presenting comprises presenting the selectable option responsive to a navigation to the website.

3. A computer-implemented method as recited in claim 1, wherein said presenting comprises presenting the selectable option responsive to receiving an indication that the website supports push notifications.

4. A computer-implemented method as recited in claim 1, further comprising authenticating with a notification service that is remote from the client device prior to said obtaining, and wherein said obtaining comprises obtaining the channel token from the notification service.

5. A computer-implemented method as recited in claim 1, wherein the push notification includes content for updating the tile.

6. A computer-implemented method as recited in claim 1, further comprising updating the tile on the client device with the push notification and separately from a display of the website.

7. A computer-implemented method as recited in claim 1, further comprising outputting the push notification via the client device separately from a display of the website.

8. A computer-implemented method as recited in claim 1, further comprising:
determining that the channel token is expired; and
causing the channel token to be refreshed.

9. A system comprising:
at least one processor; and
one or more computer-readable storage media including instructions stored thereon that, responsive to execution by the at least one processor, cause the system to perform operations including:
presenting a selectable option for adding a visual indicator that represents a website for display on a client device;
configuring, via one or more computing devices, a push notification channel for the client device in response to a selection of the selectable option to add the visual indicator thereby enabling push notification from the website to the visual indicator, said configuring the push notification including obtaining a channel token that enables notifications to be pushed to the client device, and communicating the channel token to the website;
receiving a notification from the website at the client device via the push notification channel and independent of a user navigating to the website or having a browser open; and
populating the push notification to the visual indicator.

10. A system as recited in claim 9, wherein said presenting comprises presenting the selectable option responsive to a navigation to the website.

11. A system as recited in claim 9, wherein said presenting comprises presenting the selectable option responsive to receiving an indication that the website supports push notifications.

12. A system as recited in claim 9, wherein the notification includes content for updating the visual indicator on a display of the client device.

13. A system as recited in claim 9, wherein the operations further comprise updating the visual indicator on the client device with the notification and separately from a display of the website.

14. A system as recited in claim 9, wherein the operations further comprise outputting the notification via the client device separately from a display of the website.

15. One or more computer-readable storage media having instructions stored thereon that, responsive to execution by at least one processor, cause the at least one processor to perform operations comprising:
presenting a selectable option for adding a visual indicator that represents a website for display on a client device;
configuring, via one or more computing devices, a push notification channel for the client device in response to a selection of the selectable option to add the visual indicator thereby enabling push notification from the website to the visual indicator, said configuring the push notification including obtaining a channel token that enables notifications to be pushed to the client device, and communicating the channel token to the website;
receiving a notification from the website at the client device via the push notification channel and independent of a user navigating to the website or having a browser open; and
populating the push notification to the visual indicator.

16. One or more computer-readable storage media as recited in claim 15, wherein the notification includes content for updating the visual indicator.

17. One or more computer-readable storage media as recited in claim 15, wherein the operations further comprise updating the visual indicator on the client device with the notification and separately from a display of the website.

18. One or more computer-readable storage media as recited in claim 15, wherein the operations further comprise outputting the notification via the client device separately from a display of the website.

19. One or more computer-readable storage media as recited in claim 15, wherein the visual indicator is selectable to cause a navigation to the website.

20. One or more computer-readable storage media as recited in claim 15, wherein said presenting comprises presenting the selectable option responsive to a navigation to the website or presenting the selectable option responsive to receiving an indication that the website supports push notifications.

* * * * *